March 9, 1943.  S. RUBEN  2,313,094
ELECTROSTATIC CONDENSER
Filed July 22, 1939
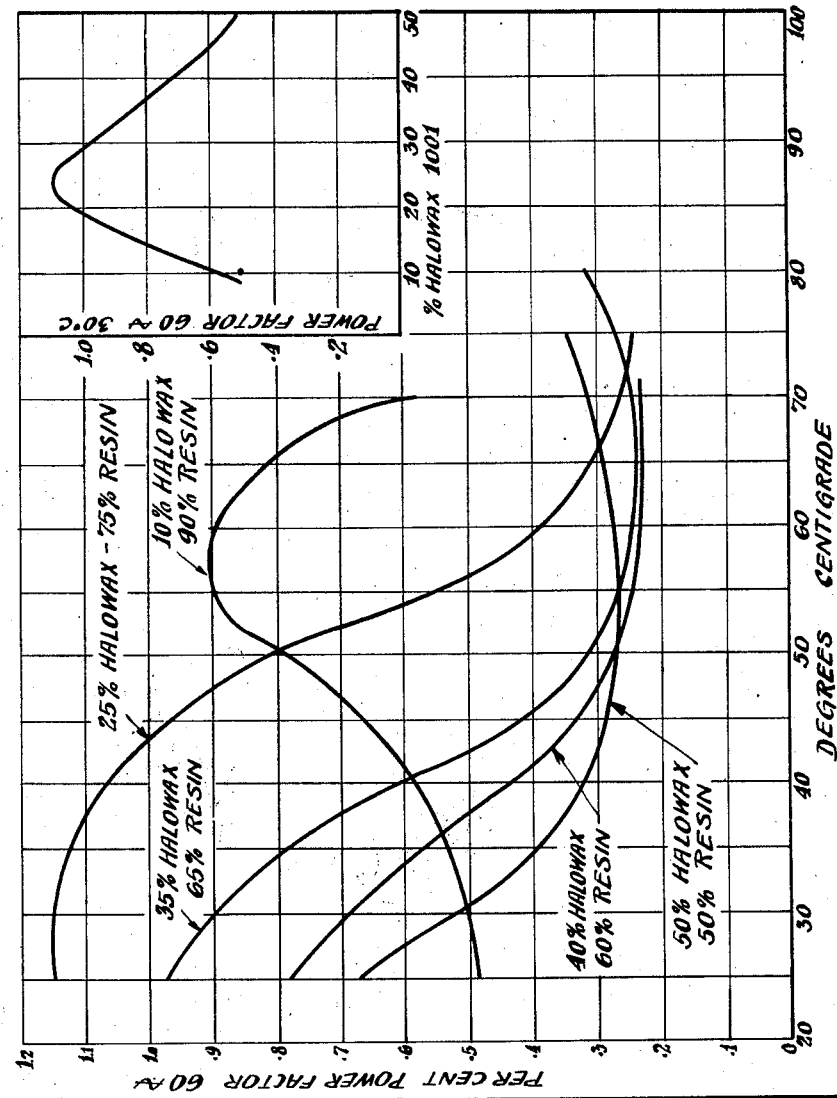
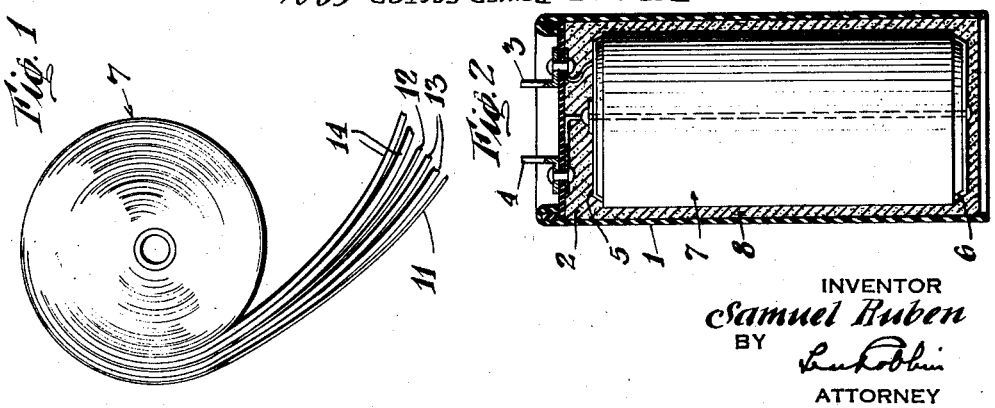
INVENTOR
Samuel Ruben
BY
ATTORNEY Patented Mar. 9, 1943

2,313,094

UNITED STATES PATENT OFFICE 2,313,094

ELECTROSTATIC CONDENSER

Samuel Ruben, New Rochelle, N. Y.

Application July 22, 1939, Serial No. 285,891

5 Claims. (Cl. 175—41)

This invention relates to electrostatic condensers and particularly to electrostatic condensers employing solid dielectrics of the type described in my copending application Serial No. 279,824, of which the present application is a continuation in part.

The general object of the invention is to provide an electrostatic condenser having a solid dielectric, having a reducing power factor with increase in temperature throughout the operating range of the condenser.

A further object is the provision of a condenser of this type which is non-inflammable.

Still another object is the provision of a solid dielectric condenser of the wound foil spacer type which possesses high voltage breakdown and high resistivity.

Other objects will be apparent as the disclosure proceeds and from the drawing in which Fig. 1 is an end view of a condenser section partly assembled; Fig. 2 is a view partly in section of a completed condenser and Fig. 3 is a graph giving temperature-power factor characteristics of condensers made according to this invention.

In the use of solid dielectric condensers employing resin base dielectrics, I have found that it is practically necessary to use a supplementary dielectric with the resin in order to obtain the required plasticity and avoid an otherwise brittle condition. The use of such plasticizing dielectrics is also a practical necessity where some resins are used, such as the preferred $C_{40}H_{40}$, to reduce the temperatures at which impregnation of the condenser can take place. Unless complete impregnation of the porous cellulose spacers is obtained the breakdown voltage is low due to crackage occurring in cooling of the resin and a short alternating current condenser life results due to the rigid structure and loosening of the bond between the electrodes and the dielectric. As pointed out in my above-mentioned copending application, a shattering effect is noted on alternating current when the dielectric is too brittle.

The present application is specific to one of the combinations described in my copending case. It relates to the addition of halogenated solids, such as chlorinated naphthalene, to the hydrocarbon resins mentioned in my copending application. The addition of solid chlorinated naphthalene to the hard brittle $C_{40}H_{40}$ softens the resin, according to the proportions used, the hardness ranging from that of a slightly deformable plastic material to that of a viscid solid having a cold flow point of about 20° C. I have found that 45% by weight of chlorinated naphthalene is the maximum that can be combined with $C_{40}H_{40}$ to form a clear homogeneous resin. The combined dielectric is a clear amber colored material possessing new characteristics different from those of either the resin or the Halowax. Its power factor characteristic is quite opposite to that of chlorinated naphthalene, which rapidly increases with temperature rise. In the dielectric of this invention there is a decreasing power factor with temperature rise above 20° C., when the chlorinated naphthalene content is greater than 20%.

Chlorinated naphthalene by itself has never been usable on alternating current due to various reasons, such as its instability, crystalline character, porosity and poor moisture resistance. These defects are eliminated when the chorinated naphthalene is combined with the resin such as $C_{40}H_{40}$ and a compound is obtained which is water proof, non-inflammable, capable of operating on continuous alternating current and which possesses a good dielectric constant. Where substantially more than 45% of the chlorinated naphthalene is used, there is some precipitation of the chlorinated naphthalene and a decrease in voltage breakdown. Where more than 50% of the chlorinated naphthalene is used a mechanical emulsion type mixture of chlorinated naphthalene and resin is obtained at room temperature, instead of a homogeneous, light colored clear resin, with apparently an excess of uncombined or undissolved chlorinated naphthalene.

The chlorinated naphthalene-resins have a lower melting point than the resins alone and a lower hot viscosity, according to the amount of chlorinated naphthalene combined and as a result, the impregnation of paper-spacer electrostatic condensers is more satisfactory and complete.

The composition of solid chlorinated naphthalene and the resin is quite dissimilar from mixtures of waxes and chlorinated naphthalene which when hot go into solution but which when cool are only intimate mechanical mixtures of opaque character.

The preferred percentage of chlorinated naphthalene to be added to the resin especially when the tetramer of di-hydronaphthalene is used and which allows ready impregnation is about 40%. This composition is solid at temperatures up to 60° C. and has a reducing power factor characteristic with temperature. This latter property is of major importance in non-liquid type alternating current electrostatic condensers because it prevents the rise in power factor due to the poor heat conductivity inherent in immobile dielectrics and gives the equivalent of a circulating dielectric of low power factor. The dielectrics of this invention, due to the immobilization of any ionic conduction elements or cataphoric conduction which occurs when liquid dielectrics are used with porous spacers, have extremely high resistivity, for instance, in the order of 15,000 megohms per microfrad.

While the solid hydrogenated naphthalene is the preferred resin, the solid chlorinated naphthalene may also be combined with other resins of the type described in my copending application Serial No. 279,824, such as solid hydrogenated indene, solid hydrogenated coumarone indene, etc. However, none of the other resins approach the $C_{40}H_{40}$ in desirable electrical and operating characteristics.

In the manufacture of the condenser, the units may be wound with two paper spacers or composite spacers of paper and processed sheet cellulose of the type described in my copending application Serial No. 256,668 and evacuated for several hours at 120° C. to eliminate moisture and vapors. The sections are then subjected to impregnation in the plasticized resin described, for example the 40% solid chlorinated naphthalene-60% solid hydrogenated naphthalene composition for a period of 10 hours at 145° C. The sections are then allowed to cool to about 80° C. at which temperature they may be placed in cardboard or metal containers. They may be sealed against any flow of dielectric from the sections, up to temperatures of 80° C., by the use of a sealing composition made from 10% solid chlorinated naphthalene-90% $C_{40}H_{40}$; or for a lower cost sealing composition it is possible to use a mixture of 55% polymerized indene and 45% solid chlorinated naphthalene. The excellent dielectric properties of the stable hydrogenated hydrocarbon resins, such as $C_{40}H_{40}$ predominate in all of the practically usable mixtures of the solid chlorinated naphthalene and solid hydrogenated naphthalene.

For a 220 volt continuous operation alternating current condenser, I may employ two spacers of .425 mil thick paper or one spacer of processed regenerated sheet cellulose 1 mil thick, impregnated with a 40% solid chlorinated naphthalene-60% $C_{40}H_{40}$ mixture. Such a condenser has a direct current voltage breakdown of approximately 3500 volts and an operating power factor less than .5%. Furthermore, the character of these units enable them to be operated enclosed in a motor frame as the power factor, contrary to the present commercial art condensers, is better at the higher operating temperatures as can be noted from Fig. 3 of the drawing. The curves shown in this graph were plotted from the results of tests with wound foil electrostatic condensers employing two spacers of .4 mil kraft paper. The percentages of Halowax (solid chlorinated naphthalene) to resin ($C_{40}H_{40}$) are indicated on the curves and also the relation of power factor to percent Halowax at 30°.

In the partially assembled condenser of Fig. 1, condenser roll 7 comprises aluminum foils 11 and 12 with interleaved paper spacers 13 and 14.

Fig. 2 illustrates a desirable condenser construction. The wound condenser section 7 having its electrodes wound in offset relation, as is well-known in the art, is provided with suitable contacting terminals 5 and 6 which engage the two electrodes respectively and which are held in contact with the electrodes by a suitable wire running through the center of the condenser and shown in the figure in dotted lines. Contact 5 is connected by wire to condenser terminal 3 which is riveted to the fibrous cap 2 of fibrous tube 1. Contact 6 is connected through the center wire to a condenser terminal 4 which is also riveted to cap 2. The end of fibrous tube 1 opposite to cap 2 is left open as indicated.

What is claimed is:

1. An electrostatic condenser comprising cooperating electrodes and a dielectric layer therebetween and adhering thereto, said layer comprising the product of a thermoplastic, thermoadhesive, liquefiable, hydrogenated hydrocarbon polymer resin and solid chlorinated naphthalene as a plasticizer therefor, said resin being thermoplastic, thermoadhesive and heat liquefiable.

2. An electrostatic condenser comprising cooperating electrodes and a dielectric layer therebetween and adhering thereto, said layer comprising the product of a thermoplastic, thermoadhesive, liquefiable, hydrogenated aromatic hydrocarbon polymer resin and solid chlorinated naphthalene as a plasticizer therefor, said resin being thermoplastic thermoadhesive and heat liquefiable.

3. An electrostatic condenser comprising cooperating electrodes and a dielectric layer therebetween and adhering thereto, said layer comprising a dielectric resin composition composed of a thermoplastic, thermoadhesive, liquefiable, hydrogenated aromatic hydrocarbon polymer resin and a relatively smaller amount of solid chlorinated naphthalene as a plasticizer therefor, said resin being thermoplastic, thermoadhesive and heat liquefiable.

4. In an electrostatic condenser of the type comprising electrodes and spacers, the combination with said electrodes and spacers of a dielectric resin composition impregnating said spacers and adhering to said electrodes, said resin composition comprising in major proportions the product of a thermoplastic, thermoadhesive, liquefiable, hydrogenated hydrocarbon polymer resin and solid chlorinated naphthalene as a plasticizer therefor, said resin being thermoplastic, thermoadhesive and heat liquefiable.

5. A dielectric spacer element for an electrostatic condenser comprising a sheet of porous dielectric material and a dielectric resin composition impregnating said sheet, said composition being composed of the solid tetramer of di-hydronaphthalene and 20 to 50% solid chlorinated naphthalene as a plasticizer therefor, said resin being thermoadhesive and heat liquefiable.

SAMUEL RUBEN.